120,393

UNITED STATES PATENT OFFICE.

ALFRED PARAF, OF NEW YORK, N. Y., ASSIGNOR TO THE MADDER COLOR COMPANY, OF SAME PLACE.

IMPROVEMENT IN DYEING AND PRINTING MADDER COLORS.

Specification forming part of Letters Patent No. 120,393, dated October 31, 1871.

*To all whom it may concern:*

Be it known that I, ALFRED PARAF, of France, now residing in the city, county, and State of New York, have made an invention of a new and useful Process of Dyeing and Printing Madder Colors; and that the following is a full, clear, and exact description and specification of the same.

The subject of this invention is to enable fibrous and textile articles, and particularly those of animal origin, to be more easily and economically dyed and printed with madder colors than has heretofore been practicable. In order that madder colors may be applied with the greatest economy (so far as my experience informs me) the color must be in a state of solution, or in a soluble condition. It is well known that the coloring matter of madder is soluble in a solution of a fixed caustic alkali, as, for example, in a solution of caustic soda or caustic potash; but as these substances have an injurious action upon articles of animal origin the compounds of madder color with them have not thus far been used for dyeing and printing such articles. On the other hand, the coloring matter of madder is soluble in a solution of caustic ammonia, which does not materially injure fibrous and textile materials of animal origin; but such a solution has not been practically used for dyeing and printing because of the incidental great loss of coloring matter resulting from the formation of soluble compounds of that matter with the mordants in the dyeing and printing operations.

My invention is based upon the discovery that the coloring matter of madder is rendered soluble in a solution of a neutral salt of a fixed alkali by the action of ammonias; and my invention consists of a process embodying the following operations, viz.: First, the application of the madder color to the article in solution with a neutral salt of a fixed alkali and with ammonia. Second, the precipitation of the coloring-matter by the mordant adapted to the peculiar color required, and the consequent liberation of the ammonia. In this process the presence of the salt of the fixed alkali prevents the solution of the compounds which the mordants form with the color, and consequently prevents the loss of color, while the neutral character of the salt prevents the alkaline base from injuring the article to be colored, even though it be formed of a material of animal origin. On the other hand, the ammonia enables the color to be applied to the article in a liquid form, but without injury to the article; and as this agent is volatile, whatever portions of it remain in the article after the production of the color in or upon it are readily removed by the exposure to the air and the heating to which articles which have been dyed and printed are subjected in the operations of finishing them for sale.

In order that my invention may be fully understood, I will proceed to describe the modes in which I have practiced it with success with woolen goods.

The combination of the coloring matter of madder with the neutral alkaline salt and with the ammonia, the product of which I term alizaride, and which constitutes the subject-matter of a separate patent, is produced as follows, viz.: Mix together ten pounds (avoirdupois) of the extract of the madder in the condition of paste in which it is found in commerce with half a pound (avoirdupois) of finely-ground carbonate of potash; mix the two thoroughly by grinding them or stirring them, and permit the mixture to rest until the carbonate of potash is absorbed by the madder extract, which generally requires about one hour. Then stir into the above compound a weak solution of ammonia, consisting of two gallons of water containing one pound (apothecaries'weight) of aqua ammonia of commerce; heat the mixture slightly—say to a temperature of about 200° Fahrenheit—until the entire mass becomes liquid taking care not to raise it to a boiling heat.

Wool or woolen goods or articles to be dyed of a chocolate color are prepared for the operation as follows: The article is first boiled for fifteen minutes or thereabout in a weak solution of the oxalate and tartrate of alumina, consisting of water, one hundred pounds; oxalate of alumina, two and one-half pounds; and tartrate of alumina, two and one-half pounds. The article is taken from the liquid and is freed from the residue as thoroughly as possible by means of a hydro-extractor. The article is then immersed for fifteen minutes in cold water containing, in solution, acetate of chromium in the proportion of one pound of the acetate for every two hundred pounds of water. The article is removed from the liquid and again subjected to the action of the hydro-extractor. The article is then immersed for ten minutes in cold water containing chloride of tin, chlorate of potash, and sulphate of ammonia, in the following proportions, viz.: Water, one hundred pounds; chloride of tin, one pound; chlorate of potash, one and one-fourth pound; and sulphate of ammonia, one pound. The article is then passed again through the hydro-extractor and is ready for dyeing.

If the article is to be dyed crimson or red shades it is prepared exactly as above described for chocolate, with the exception of the treatment with the acetate of chromium, which is dispensed with.

For scarlets, oranges, and salmon shades the article is prepared in the same manner as for crimson, but is subsequently dyed in a solution of Persian berries in water, applied in the ordinary way, after which the article is subjected to the hydro-extractor.

The woolen articles prepared in the above different modes are dyed in the required shades as follows: When the chocolate shade is required, the article is dyed in a solution of alizaride in warm water, say about 120° Fahrenheit, in the proportions of two and one-half pounds of fluid alizaride for each one hundred pounds of the weight of the article until the dye-bath is exhausted. For red and crimson the article is dyed in the same manner as for chocolate in the solution of alizaride of the same quality, and likewise for scarlets. Salmon shades and pink shades of any gradation are obtained by using weaker solutions of alizaride, as required for the particular shade. Orange shades of any gradations are produced by passing the article dyed of the before-mentioned shades through a weak solution of any suitable acid in water, a solution of muriatic acid in the proportions of one-half pound acid to one hundred pounds of water, or water containing ten per cent. acetic acid is preferred. After the articles have been dyed with any of the above shades they are washed and scoured in the usual manner.

In order to obtain by printing any of the above-described shades the articles are prepared in the same manner as for dyeing, and are subsequently printed with colors made as follows: For chocolate, crimson, reds, and scarlets, one gallon of alizaride is thickened with starch in the ordinary manner practiced in the preparation of colors for printing, and the cloths printed in the ordinary manner with this compound. To obtain the gradation of pinks the printing color is reduced with starch-paste according to the shade wanted. After printing, the articles are steamed, washed, and scoured in the usual manner.

To obtain oranges of any gradation the article must be treated with a weak acid solution in the same way as for dyeing. The article properly prepared is first printed, then steamed for half an hour, then washed, then passed through the acid solution, and is subsequently washed and scoured as usual.

Having thus described the best modes of practicing my invention with which I am at present acquainted, I claim as my invention—

The compound process, substantially as hereinbefore set forth, of applying madder colors in solution to an article and precipitating the color in the said article.

Witness my hand this 12th day of September, A. D. 1871.

ALFRED PARAF.

Witnesses:
   EMESTSLEYE,
   C. G. EVANS. (11)